United States Patent [19]

Hayakawa et al.

[11] Patent Number: 5,723,155
[45] Date of Patent: Mar. 3, 1998

[54] COMPOSITE INSULATOR-PRODUCING COMPRESSION MOLD DEVICE

[75] Inventors: Koji Hayakawa, Handa; Osamu Tsuji, Nagoya, both of Japan

[73] Assignee: NGK Insulators, Ltd., Japan

[21] Appl. No.: 612,783

[22] Filed: Mar. 8, 1996

[30] Foreign Application Priority Data

Mar. 23, 1995 [JP] Japan ................................ 7-063883

[51] Int. Cl.⁶ .......................... B29C 43/18; B29C 43/38
[52] U.S. Cl. ................ 425/116; 425/395; 425/DIG. 47
[58] Field of Search ........................ 425/116, 408, 425/117, 121, 543, DIG. 47, DIG. 60, 395; 264/325

[56] References Cited

U.S. PATENT DOCUMENTS

| | | | |
|---|---|---|---|
| 4,204,822 | 5/1980 | Hewitt | 425/DIG. 60 |
| 4,688,752 | 8/1987 | Barteck et al. | 425/116 |
| 4,957,676 | 9/1990 | Greenwood | 425/405.1 |
| 5,082,615 | 1/1992 | Sakai | 264/272.14 |
| 5,118,271 | 6/1992 | Baird et al. | 425/116 |
| 5,399,082 | 3/1995 | Shimizu | 425/395 |
| 5,484,564 | 1/1996 | Goto | 264/275 |
| 5,523,038 | 6/1996 | Kunieda et al. | 425/116 |

FOREIGN PATENT DOCUMENTS

| | | | |
|---|---|---|---|
| 36 21 653 A1 | 4/1987 | Germany | 174/179 |
| 58-205740 | 11/1983 | Japan | 425/DIG. 47 |
| 61-121917 | 6/1986 | Japan | 425/DIG. 47 |
| 61-234536 | 10/1986 | Japan | 425/117 |
| 62-167013 | 7/1987 | Japan | 425/408 |
| 62-193814 | 8/1987 | Japan | 425/DIG. 60 |
| 63-149121 | 6/1988 | Japan | 425/DIG. 60 |
| WO 82/02698 | 8/1982 | WIPO | 425/116 |

Primary Examiner—Robert Davis
Attorney, Agent, or Firm—Parkhurst & Wendel

[57] ABSTRACT

A composite insulator-producing compression mold device including a pair of molding units each having a recess for the formation of a housing of a composite insulator. At least one partition plate is fitted to a first one of the molding units near the composite insulator housing-forming recess and at a location radially outwardly from the recess. An urging mechanism is provided for urging the partition plate toward the second molding unit such that an outer end portion of the partition plate may project toward the second molding unit from a parting face of the first molding unit when the molding units are opened. When the molding units are closed, the partition plate is received within the first molding unit. Another mechanism is provided for preventing the partition plate from being detached from the first molding unit. As the molding units are to be closed, the outer end portion of the partition plate located outside the first molding unit is brought into contact with a mold-parting face of the second molding unit by the urging mechanism. Accordingly, an insulating macromolecular material fed into the recess for the formation of the housing is prevented from flowing radially outwardly between the parting faces.

22 Claims, 9 Drawing Sheets

FIG_9
PRIOR ART

COMPOSITE INSULATOR-PRODUCING COMPRESSION MOLD DEVICE

BACKGROUND OF THE INVENTION

The present invention relates to a composite insulator-producing compression mold device. In this specification and claims, "composite insulator" means an insulator including a core member made of a material such as a fiber-reinforced plastic (FRP) and a housing formed around the outer peripheral surface of the core member and made of an insulating material such as EPDM rubber, silicone rubber, ethylene-propylene copolymer or ethylene-propylene-diene copolymer. Although the term "insulator" is used in this application, this term is intended to mean both solid and hollow insulators.

Figure 7:
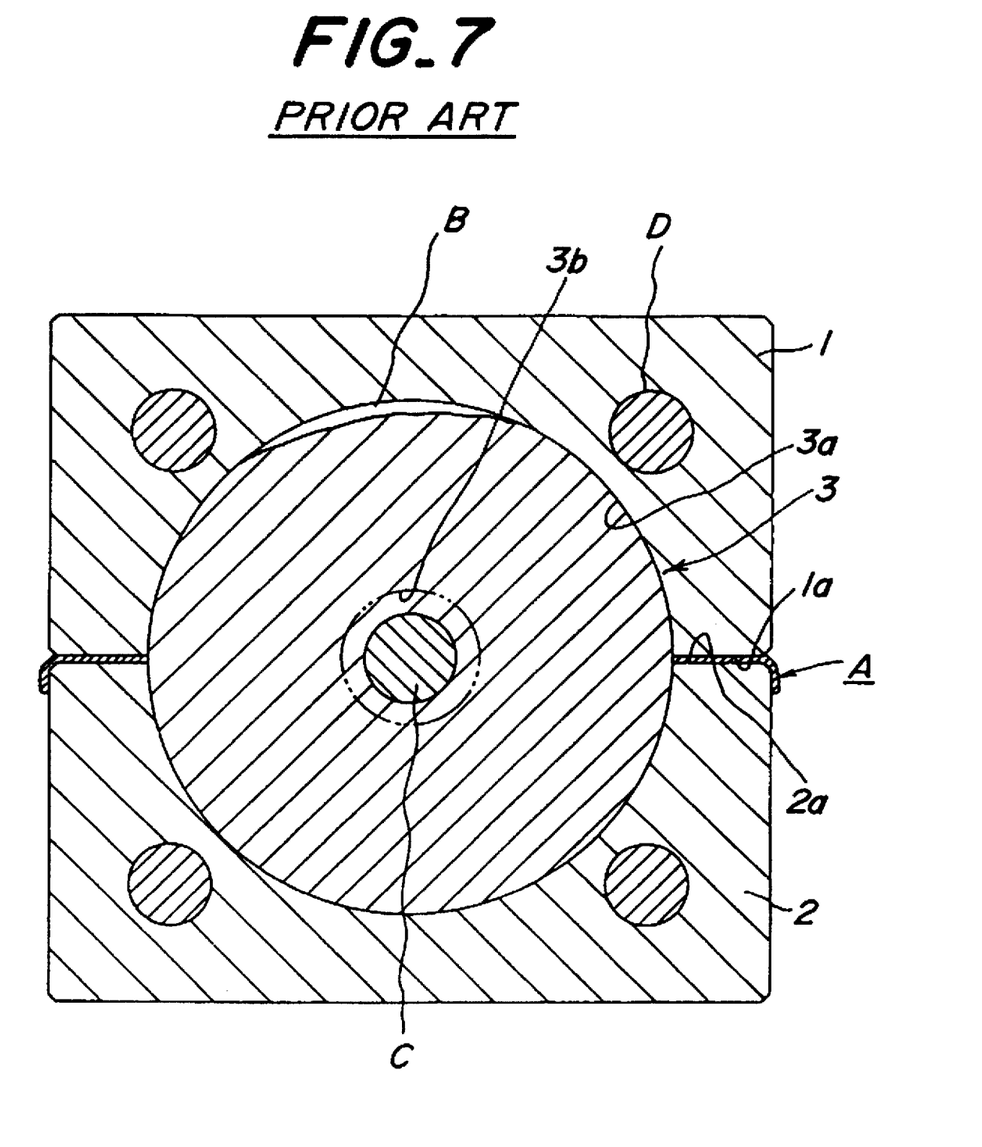
FIG. 7 is a cross sectional view for schematically illustrating a defect occurring when a composite insulator is produced by using the conventional compression mold device.

Heretofore, a compression molding process has been employed for producing composite insulators. According to this method, a housing preform body made of a housing-forming material is wound around a core member, the thus obtained assembly is placed between upper and lower mold units having recesses for the formation of the housing, and a housing is formed around the outer periphery of the core member after the mold units are closed. FIG. 7 shows a cross sectional view of a mold device for effecting such a compression molding process. In this figure, reference numerals 1 and 2 denote an upper mold unit and a lower mold unit, respectively. A housing-forming recess 3 is formed between the upper and lower mold units when closed, and this recess 3 includes recesses 3a for the formation of shed portions and recesses 3b for the formation of a sheath portion. When the housing is formed around the core member by using this mold device, it is necessary that a housing preform body made of a housing-forming material in such an amount as greater than that required for forming the housing uniformly all over the housing-forming recess 3 is wound around the core member. The resulting assembly is placed between the mold units and the housing is formed by compression molding. At that time, an excess amount of the housing-forming material flows out through a gap between parting surfaces 1a and 2a of the upper and lower mold units 1 and 2, respectively ("A" in FIG. 7). On the other hand, if the amount of the housing preform body made of the housing-forming material is too small, a deficient portion is produced ("B" in FIG. 7). In FIG. 7, C denotes the core member, and D denotes a tightening bolt.

Figure 8:
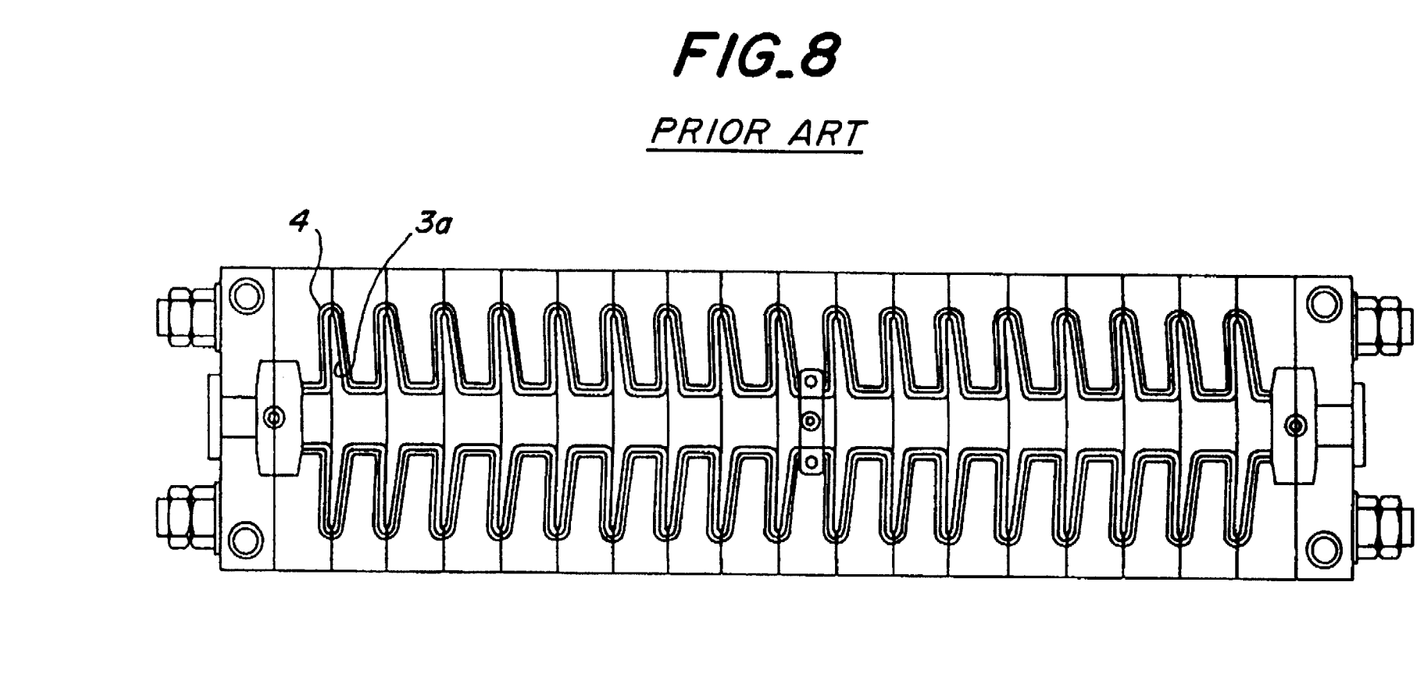
FIG. 8 is a view of the molding unit of another conventional compression mold device in which the housing-forming material escape groove is formed.

To cope with the above-mentioned problem, it is known to form housing material-escape grooves 4 at the mold-parting surface along the recess 3 for the formation of the recess 3, as shown in FIG. 8, so that the housing-forming material may not flow out from the mold device. However, the leakage of the housing-forming material cannot be sufficiently prevented by such escape grooves only, so that the yield of the housing-forming material cannot be satisfactorily enhanced.

Figure 9:
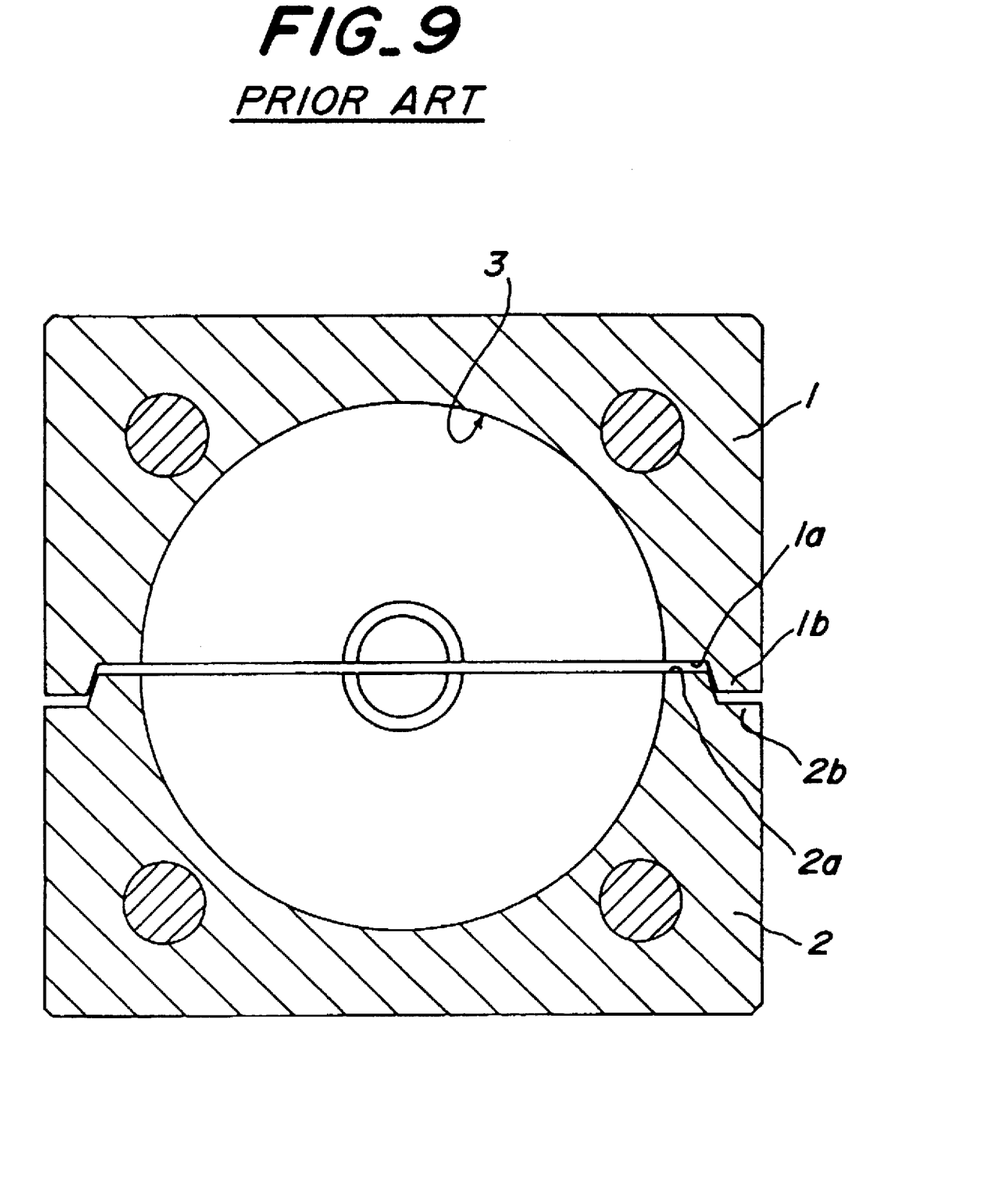
FIG. 9 is a cross sectional view of a further conventional compression mold device in which matching steps are formed at opposite mold-parting faces of the upper and lower molding units, respectively.

Further, in order that the shed portions may be uniformly formed at high yield without any defect while reducing an excess amount of the housing-forming material, a technique is proposed as shown in FIG. 9. Projections 1b are provided at opposite outer side portions of the mold-parting face 1a of the upper mold unit 1 and depressions 2b are formed at corresponding outer side portions of the lower mold unit 2 so that the projections 1b may mesh with the respective depressions 2b to prevent the housing-forming material from flowing out from the mold device and improve the yield of the housing-forming material. However, according to this process, corner portions of the recess 1b and the projection 2b are likely to be damaged through contact between them. Consequently, durability of the mold device becomes a problem. Further, the above technique unfavorably requires the parting faces of the mold units to be worked over a wide area so as to form the projection 1a and the recess 2b.

SUMMARY OF THE INVENTION

The present invention has been made in view of the above-mentioned problems, and is aimed at the provision of a composite insulator-producing compression mold device which can suppress the leakage of the housing-forming material out of the mold device to the utmost during compression molding so as to reduce the formation of burrs during the molding step, uniformly and sufficiently fill up the housing-forming recess with the housing-forming material, and produce the composite insulator at a high yield.

In order to accomplish the above-mentioned object, the composite insulator-producing compression mold device is characterized by comprising a pair of molding units each having a recess for the formation of a housing of a composite insulator. At least one partition plate is fitted to one of the molding units near the composite insulator housing-forming recess and at a location radially outwardly from the recess. Urging means is provided for urging the partition plate toward the other molding unit such that an outer end portion of the partition plate projects toward the other molding unit from a parting face of one of the molding units when the molding units are opened. When the molding units are closed, the partition plate is received within one of the molding units. Means for preventing the partition plate from being detached from one of the molding units is also provided. As a pair of the molding units are to be closed, the outer end portion of the partition plate, which is located outside one of the molding units is brought into contact with a mold-parting face of the other molding unit by the urging means, and thereby an insulating macromolecular material fed into the recess for the formation of the housing is prevented from flowing radially outwardly between the parting faces.

According to the composite insulator-producing compression mold device, as a pair of the molding units are closed, the outer end portion of the partition plate located outside one of the molding units is brought into contact with a mold-parting face of the other molding unit by the urging means. Therefore, when an assembly in which a housing preform body made of the housing-forming material is wound around the outer periphery of the core member is placed between a pair of the molding units to define the housing-forming recess and the housing is formed around the outer periphery of the core member after the molding units are closed, any flow of the housing-forming material outwardly from the recess of the mold device between the mold-parting faces of a pair of the molding units can be blocked by the outer end portion of the partition plate contacting the other mold-parting face of the molding unit. Thereby, an excess amount of the housing-forming material which would produce burrs during the compression molding can be reduced.

Further, since the partition plates are separately formed from the mold unit, only the partition plates needs to be exchanged, even if they are abraded. In addition, since a recess has only to be formed in an ordinarily used mold unit so as to fit the partition plate therein, a working area can be reduced.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains.

BRIEF DESCRIPTION BRIEF DESCRIPTION OF THE DRAWINGS

For a better understanding of the invention, reference is made to the attached drawings, wherein.

DETAILED DESCRIPTION OF THE INVENTION

First, preferred embodiments of the present invention will be recited as follows:

The partition plates are provided over substantially an axially entire length of the recess for the formation of the insulator housing. By so doing, the housing-forming material flowing outwardly from the recess of the mold device between the mold-parting faces of the molding units can be assuredly stopped by the the molding unit outer end portion of the partition plate contacting the mold-parting face of the other molding unit.

The partition plate is provided over substantially an axially entire length of the recess for the formation of the insulator housing, and the partition plate is divided into a plurality of plates in an axial direction of the mold device. By so doing, production of the partition plate and the attachment of the partition plate to molding unit can be easily performed, without largely reducing the effect that the housing-forming material flowing outwardly from the recess of the mold device between the mold-parting faces of the molding units can be assuredly stopped by the molding unit outer end portion of the partition plate contacting the mold-parting face of the other molding unit.

The partition plate is fitted in a hole provided in one of the molding units and opened to the parting face thereof, the urging means urges the partition plate in a direction in which the partition plate projects from the hole, and the detaching-preventing means prevents the partition plate from becoming detached from the hole. By so doing, the molding unit outer end portion of the partition plate can be smoothly and assuredly contacted with the mold-parting face of the other molding unit.

Another hole is provided in the other molding unit and opened to the mold-parting face thereof, to receive the outer end of the partition plate when the molding units are closed. By so doing, when the molding units are closed, the molding unit outer end portion of the partition plate is received in the another hole in the other molding unit. Therefore, the housing-forming material flowing outwardly from the recess of the mold device between the mold-parting faces of the molding units can be assuredly stopped by the the molding unit outer end portion of the partition plate contacting the mold-parting face of the other molding unit in cooperation with the another hole.

The recess for the formation of the housing of the composite insulator comprises a first recess for the formation of a sheath portion of the composite insulator and a second recess for the formation of a shed portion of the insulator.

The partition plate is made of a material having hardness smaller than that of a material constituting the molding units. By so doing, abrasion and damage of the molding unit due to the partition plate can be prevented.

A housing material-escape groove is provided at the parting face of at least one of a pair of the molding units near the recess for the formation of the housing. In addition to the above-mentioned features, when the housing material-escape groove is provided at the parting face of at least one of a pair of the molding units near the recess for the formation of the housing, the housing-forming material flowing outwardly from the recess of the mold device between the mold-parting faces of the molding units can be more assuredly stopped by the molding unit outer end portion of the partition plate contacting the mold-parting face of the other molding unit.

At least one of the molding units comprises a plurality of molding unit segments axially integrated together and each having a recess for the formation of one or more shed portions of the insulator body.

Each of the molding unit segments is provided with the partition plate.

Combinations of any of the above features may be arbitrarily considered as preferred embodiments of the present invention.

In the following, the present invention will be explained in more detail with reference to specific embodiments shown in the drawings. The same or similar constituent parts of the mold device explained in connection with FIGS. 7 to 9 will be given the same reference numerals.

FIGS. 1(a) and 1(b) and FIGS. 2(a) and 2(b) show a first embodiment of the composite insulator-producing compression mold device according to the present invention. FIGS.

Figure 1A:
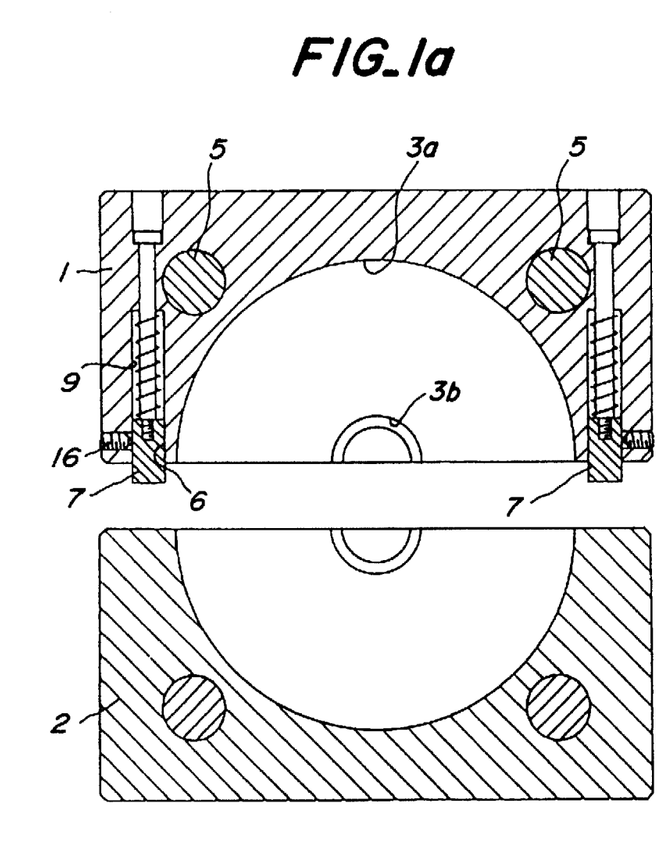
FIGS. 1(a) and 1(b) are cross sectional views of a first embodiment of the composite insulator-producing compression mold device according to the present invention in the state that a pair of molding units are opened and in the state that a pair of the molding units are closed.
Figure 1B:
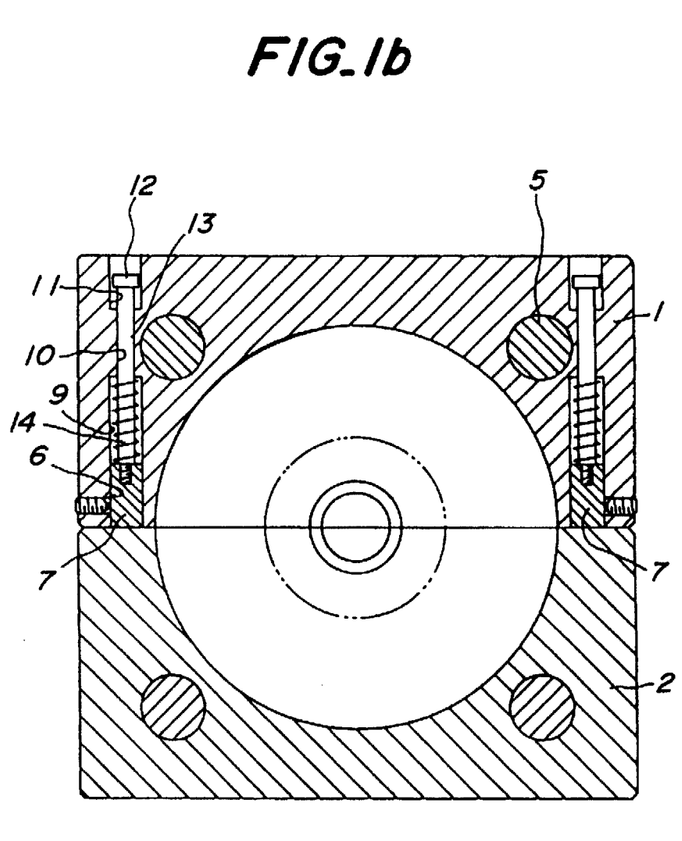
Figure 2A:
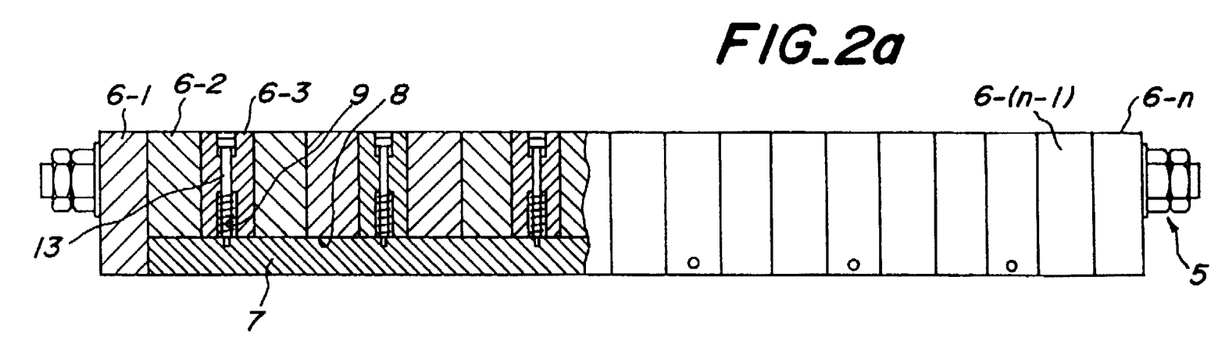
FIGS. 2(a) and 2(b) are a vertical sectional view and a bottom view of the upper molding unit of the composite insulator-producing compression mold device shown in FIGS. 1(a) and 1(b), respectively.
Figure 2B:
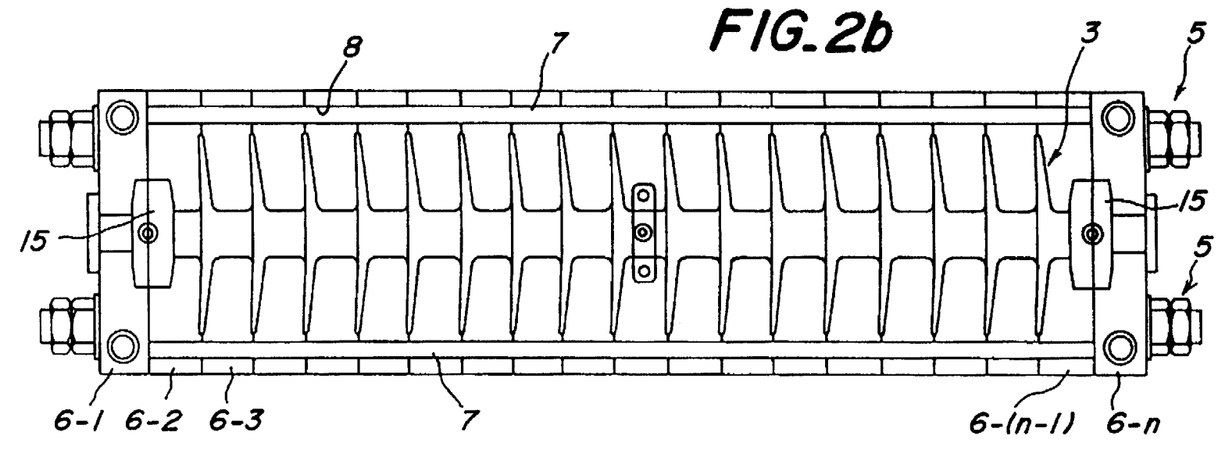

1(a) and 1(b) are cross sectional views for illustrating the state that a pair of molding units are opened and the state that a pair of the molding units are closed, respectively, and FIGS. 2(a) and 2(b) are a vertical sectional view and a bottom view of the upper molding unit of the composite insulator-producing compression mold device shown in FIGS. 1(a) and 1(b), respectively. In this embodiment, the upper molding unit is formed by closely tightening molding segments 6-1, 6-2, 6-3, . . . , 6-n by means of two tightening bolts 5. The lower molding unit has a similar structure. Near a shed portion-forming recess of each of the molding segments of the upper molding unit is provided a recess 6 opened to a mold-parting face. When the molding segments are integrally tightened together, a groove 8 for receiving a partition plate 7 is formed in the upper molding unit. The lower end face of the partition plate 7 is made flat so as to closely contact the mold-parting face of the lower molding unit. In given molding segments 6-3, 6-6, . . . , a hole 9 communicating with the recess 6, a hole 10 having a diameter smaller than that of the hole 9 and a hole 11 open to the upper face of the upper molding unit and having a diameter greater than the hole 10. A rod 13 is screwed into the partition plate at one end through the holes 9 and 10, and has a large diameter head 12 at the other end located inside the through hole 11. Around the rod 13 inside the hole 9 is provided a compression spring 14 to urge the partition plate toward the lower molding unit. In the drawings, reference numeral 16 is a ball plunger for inwardly pressing the partition plate. The head portion 12 of the rod 13 prevents the partition plate 7 from being detached from the upper molding unit. In FIG. 1(a) showing the completely opened state, the partition plate 7 is projected up to the outermost location by the compression spring 13, while the partition plate is prevented from being projected outwardly beyond the outermost projected location by means of the head 12. As the upper molding unit and the lower molding unit are closed together, the lower end face of the partition plate 7 intimately contacts the mold-parting face of the lower molding unit at a given closing position. When the molding units are completely closed, the partition plate 7 is completely slidably received inside the groove 6 as shown in FIG. 1(b). Although not shown to avoid complication, a housing-forming material escape groove as shown in FIG. 8 may be provided at the mold-parting face inwardly of the partition plate and near the recess 3. FIG. 2(b) shows the state in which a composite insulator having a housing formed is received in the upper molding unit 1 (no burr is shown). A reference numeral 15 shows a housing-forming ring fitted to each of the opposite ends of a rod C. The partition plate 7 is made of a material softer than that of the molding units, and for example, the partition plate 7 may be made of a copper alloy, an oiless metal, Teflon, or hard rubber. In FIG. 1, a reference numeral 16 denotes a ball plunger to fixedly place the partition plate 7 inside the upper molding unit.

Figure 3:
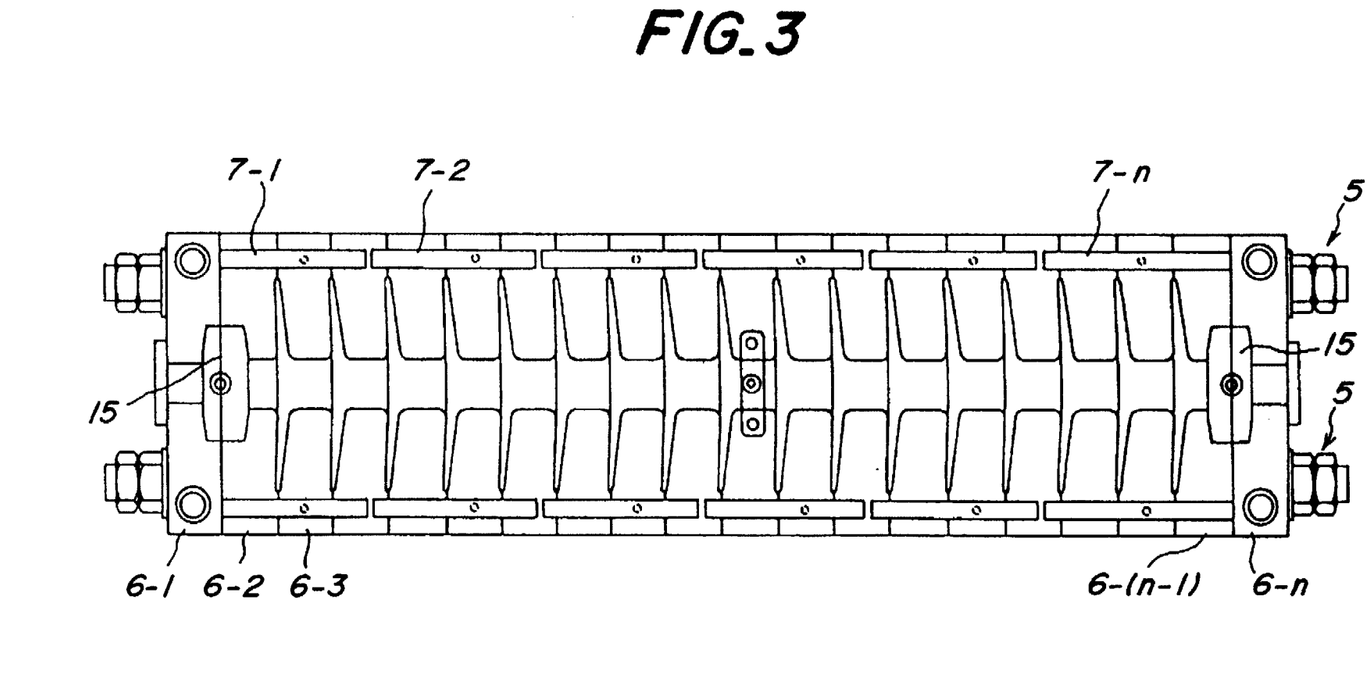
FIG. 3 is a bottom view of an upper molding unit of a second embodiment of the composite insulator-producing compression mold device according to the present invention.

FIG. 3 shows a second embodiment of the invention in which the partition plate is divided into a plurality of partition plates 7-1, 7-2, . . . , 7-m as viewed in the longitudinal direction and each partition plate has at least one urging structure as shown in FIGS. 1(a) and 1(b) and FIGS. 2(a) and 2(b). This second embodiment is the same as the first one except that the partition plate is divided.

Figure 4:
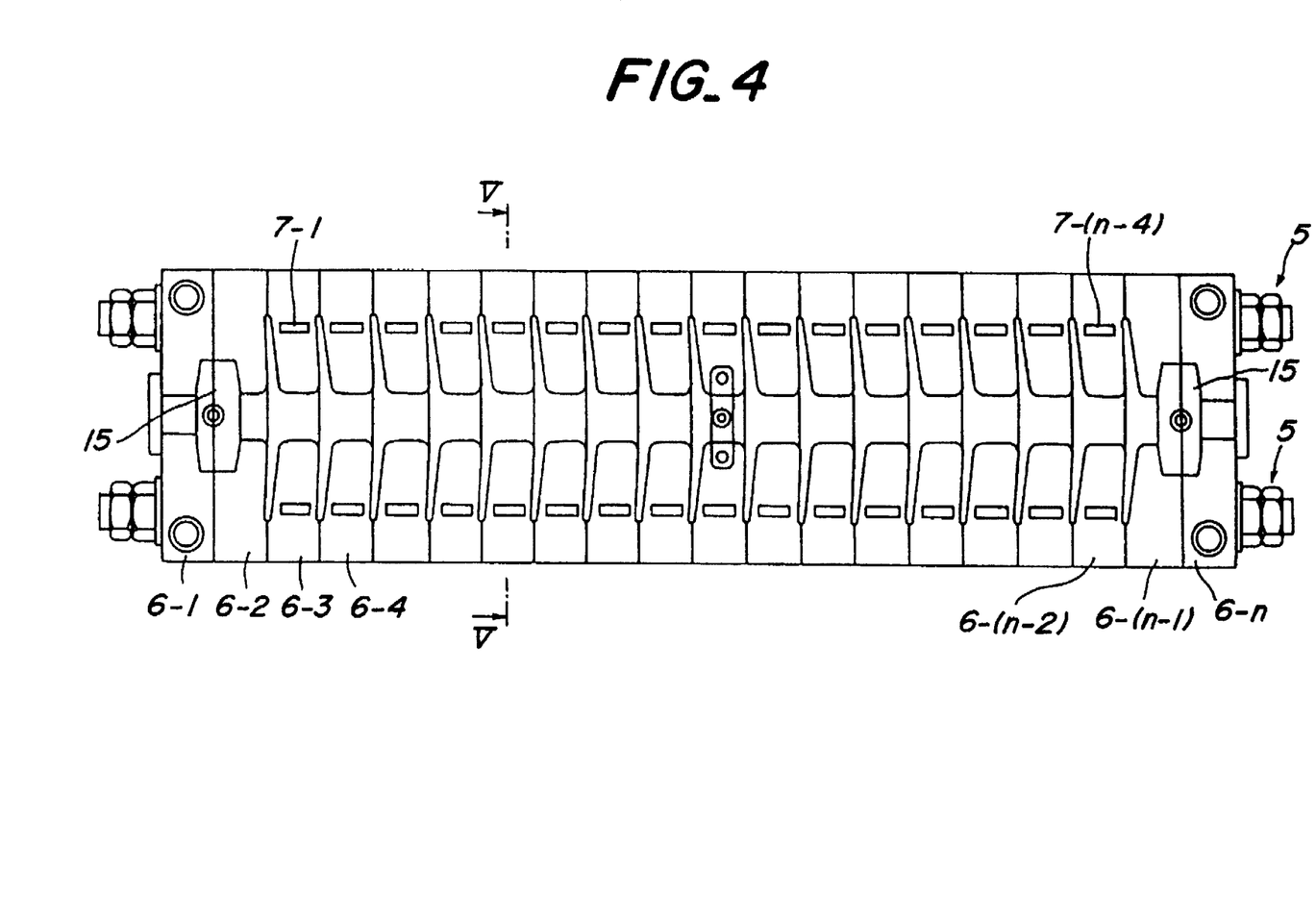
FIG. 4 is a bottom view of an upper molding unit of a third embodiment of the composite insulator-producing compression mold device according to the present invention.
Figure 5A:
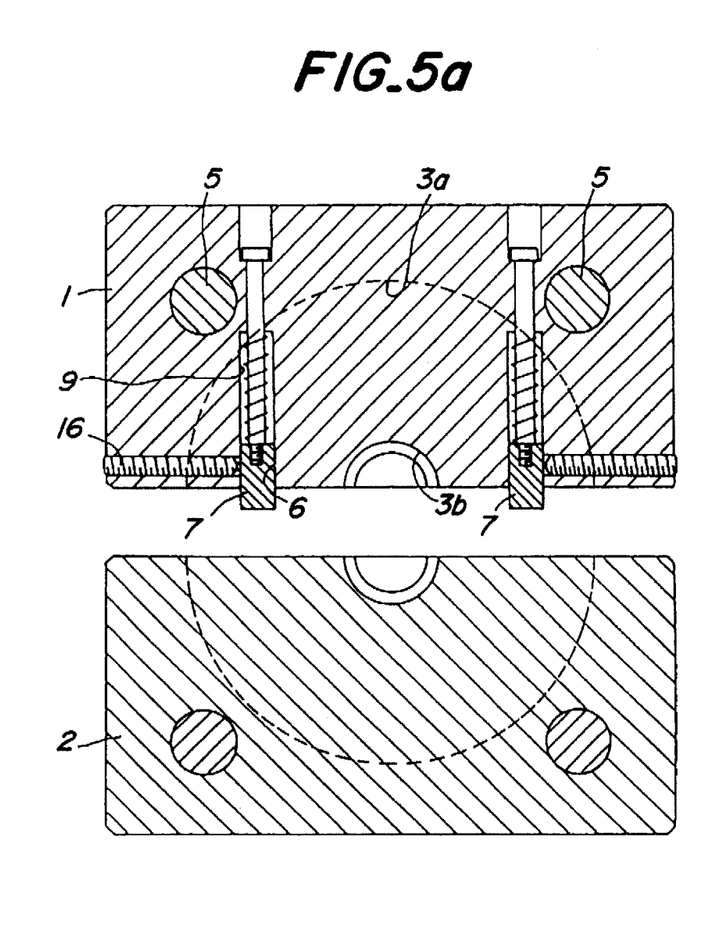
FIGS. 5(a) and 5(b) are cross sectional views of the embodiment of the composite insulator-producing compression mold device of FIG. 4 in the state that a pair of molding units are opened and in the state that a pair of the molding units are closed.
Figure 5B:
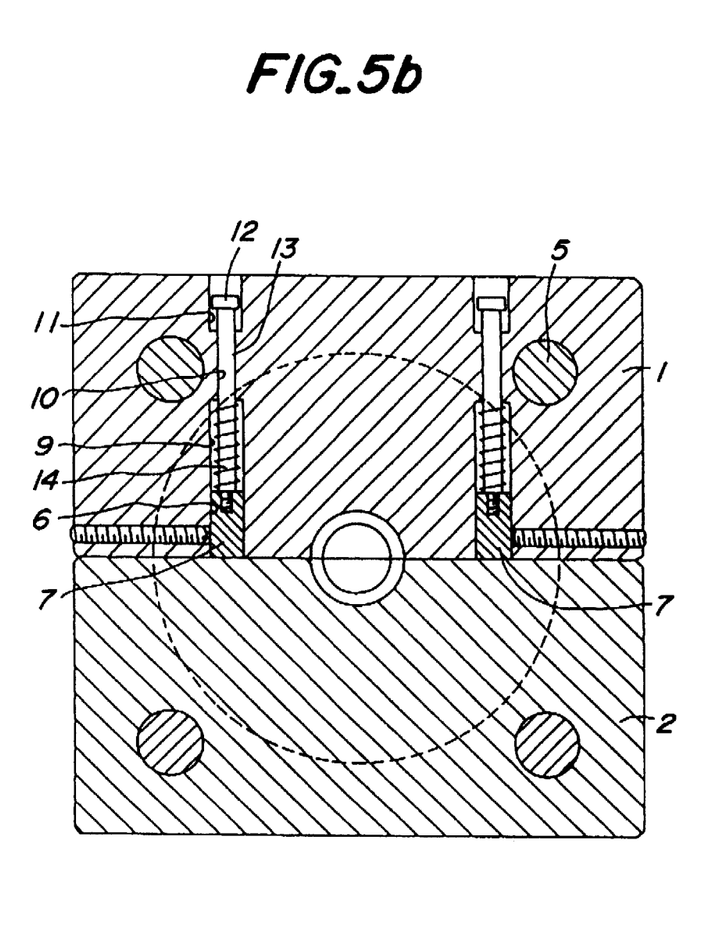

In an embodiment shown in FIG. 4 and FIGS. 5(a) and 5(b), partition plates 7-1, . . . , 7-(n-4) are provided in molding segments 6-3, 6-4, . . . , 6-(n-2) and between adjacent shed portion-forming recesses in the state that molding segments 6-1, 6-2, 6-3, 6-4, . . . , 6-n are integrally assembled together. The other constituent features in this embodiment are the same as those in the embodiment in FIG. 3. FIG. 4 is a bottom view of an upper molding unit, and FIGS. 5(a) and 5(b) are cross sectional views similar to those in FIGS. 1(a) and 1(b), respectively.

Figure 6A:
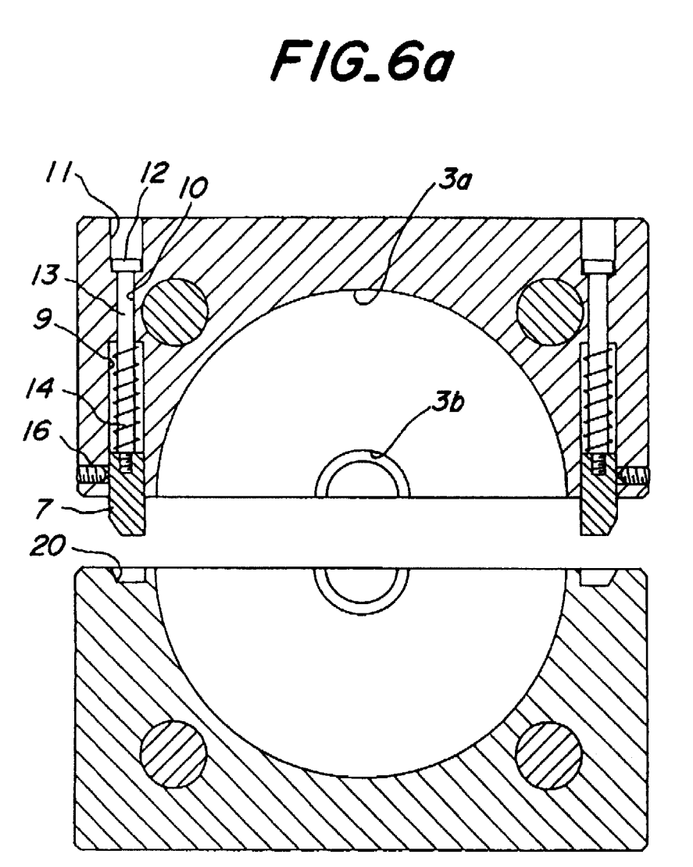
FIGS. 6(a) and 6(b) are cross sectional views of a fourth embodiment of the composite insulator-producing compression mold device in the state that a pair of molding units are opened and in the state that a pair of the molding units are closed.
Figure 6B:
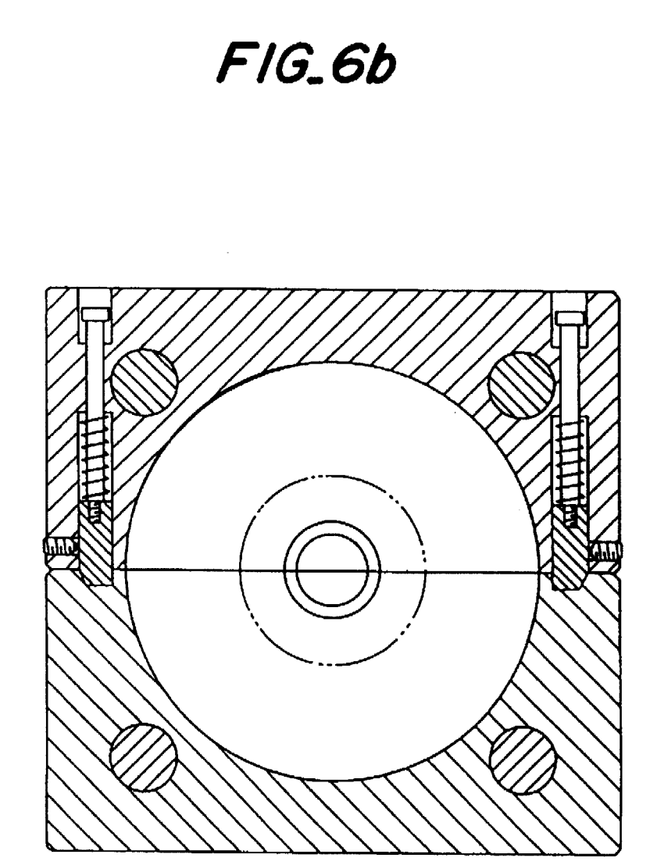

In an embodiment of FIGS. 6(a) and 6(b), each molding segment of a lower molding unit is provided with a recess 20 open to a mold-parting face of the lower molding unit and adapted for receiving a lower end portion of a partition plate 7. When the molding segments are tightened together, the recesses 20 form a groove for receiving the lower end portion of the partition plate 7. As shown in FIGS. 6(a) and 6(b), an outer side wall of the recess 20 is inclined in a downwardly lower side, and the lower end portion of the partition plate 7 is correspondingly inclined. By so doing, the lower end portion of the partition plate 7 is smoothly and assuredly guided into the recess 20 of the lower molding unit. This embodiment is substantially the same as the first embodiment except for the above.

In the above, although the present invention has been explained in connection with the embodiments specifically shown in the drawings, the invention is not limited to them. Various modifications and changes of the same could be made within the scope of the invention. For example, in the above embodiments, the partition plates are fitted to the upper molding unit. However, such partition plates may be fitted to the lower molding unit.

Additionally, each of the molding units is a divided type molding unit constituted by a plurality of the molding segments each having one shed portion-forming recess. However, a plurality of shed portion-forming recesses can be provided for each molding segment, or each of the upper and lower molding unit may be an integrated molding unit.

In the above embodiments, the partition plate is of a rectangular parallelepiped planar shape having a given thickness, but the partition plate can have a wavy sectional shape along the shed portion-forming recesses.

In the above embodiments, the rectangular parallelepiped partition plate is used, but the lower portion of the partition plate may be of such an almost semi-circular sectional shape that enables the lowermost part of the semi-circular sectional portion to contact the mold-parting face of the lower molding unit. In this case, as to the partition plate, the cylinder-rod type structure shown may be employed, or a cantilever structure may be employed in which an urging means is provided at a horizontal upper face of the partition plate so that the partition plate may enter or come out from the upper molding unit.

What is claimed is:

1. A composite insulator-producing compression mold device comprising:

a pair of molding units each having a recess for the formation of a housing of a composite insulator;

at least one partition plate fitted to one of the molding units near the composite insulator housing-forming recess and at a location radially outwardly from said recess;

urging means for urging said partition plate toward the other molding unit such that an outer end portion of the partition plate may project out of said one of the molding units toward the other molding unit from a parting face of said one of the molding units when the molding units are opened, whereas when the molding units are closed, the partition plate may be received within said one of the molding units; and     means for preventing the partition plate from being detached from said one of the molding units.

wherein during molding unit closure to receive, within said recess, insulating macromolecular material for the formation of a housing, the outer end portion of the partition plate located outside said one of the molding units is urged into contact with a mold-parting face of the other molding unit by said urging means, whereby insulating macromolecular material fed into said recess for the formation of the housing is prevented from flowing radially outwardly through and between the parting faces.

2. The mold device set forth in claim 1, wherein each of the partition plates is provided over substantially an axially entire length of said recess for the formation of the insulator housing.

3. The mold device set forth in claim 1, wherein each of the partition plates is provided over substantially an axially entire length of said recess for the formation of the insulator housing, and the partition plate is divided into a plurality of plates in an axial direction of the mold device.

4. The mold device set forth in claim 1, wherein each of said partition plates is fitted in a hole provided in said one of the molding units and open to the parting face thereof, the urging means urges the partition plate in a direction in which the partition plate projects from said hole, and the detaching-preventing means prevents the partition plate from becoming detached from the hole.

5. The mold device set forth in claim 1, further comprising another hole provided in the other molding unit and open to the mold-parting face thereof, and said another hole receives the outer end of the partition plate when the mold units are closed.

6. The mold device set forth in claim 1, wherein the recess for the formation of the housing of the composite insulator comprises a first recess for the formation of a sheath portion of the composite insulator and a second recess for the formation of a shed portion of the insulator.

7. The mold device set forth in claim 1, wherein said partition plate comprises a material having a hardness lower than that of the material constituting the mold units.

8. The mold device set forth in claim 1, further comprising a housing material-escape groove provided at the parting face of at least one of the molding units near the recess for the formation of the housing.

9. The mold device set forth in claim 1, wherein at least one of said molding units comprises a plurality of molding unit segments axially integrated together and each having a recess for the formation of one or more shed portions of the insulator body.

10. The mold device set forth in claim 9, wherein each of the molding unit segments includes said partition plate.

11. The mold device set forth in claim 2, wherein each of said partition plates is fitted in a hole provided in said one of the molding units and open to the parting face thereof, the urging means urges the partition plate in a direction in which the partition plate projects from said hole, and the detaching-preventing means prevents the partition plate from becoming detached from the hole.

12. The mold device set forth in claim 3, wherein each of said partition plates is fitted in a hole provided in said one of the molding units and open to the parting face thereof, the urging means urges the partition plate in a direction in which the partition plate projects from said hole, and the detaching-preventing means prevents the partition plate from becoming detached from the hole.

13. The mold device set forth in claim 2, further comprising another hole provided in the outer molding unit and open to the mold-parting face thereof, and said another hole receives the outer end of the partition plate when the mold units are closed.

14. The mold device set forth in claim 3, further comprising another hole provided in the outer molding unit and open to the mold-parting face thereof, and said another hole receives the outer end of the partition plate when the mold units are closed.

15. The mold device set forth in claim 2, wherein the recess for the formation of the housing of the composite insulator comprises a first recess for the formation of a sheath portion of the composite insulator and a second recess for the formation of a shed portion of the insulator.

16. The mold device set forth in claim 3, wherein the recess for the formation of the housing of the composite insulator comprises a first recess for the formation of a sheath portion of the composite insulator and a second recess for the formation of a shed portion of the insulator.

17. The mold device set forth in claim 2, wherein said partition plate comprises a material having a hardness lower than that of the material constituting the mold units.

18. The mold device set forth in claim 3, wherein said partition plate comprises a material having a hardness lower than that of the material constituting the mold units.

19. The mold device set forth in claim 2, further comprising a housing material-escape groove provided at the parting face of at least one of the molding units near the recess for the formation of the housing.

20. The mold device set forth in claim 3, further comprising a housing material-escape groove provided at the parting face of at least one of the molding units near the recess for the formation of the housing.

21. The mold device set forth in claim 2, wherein at least one of said molding units comprises a plurality of molding unit segments axially integrated together and each having a recess for the formation of one or more shed portions of the insulator body.

22. The mold device set forth in claim 3, wherein at least one of said molding units comprises a plurality of molding unit segments axially integrated together and each having a recess for the formation of one or more shed portions of the insulator body.

* * * * *